(12) United States Patent
Lee et al.

(10) Patent No.: US 12,240,325 B2
(45) Date of Patent: Mar. 4, 2025

(54) METHOD AND SYSTEM FOR GENERATING MIXED REALITY IMAGE RELATED TO DRIVING ENVIRONMENT

(71) Applicant: MORAI INC., Seoul (KR)

(72) Inventors: Jinwoo Lee, Seoul (KR); Gihyun Seo, Seoul (KR); Byeongheon Kwon, Seoul (KR)

(73) Assignee: MORAI INC., Seoul (KR)

( * ) Notice: Subject to any disclaimer, the term of this patent is extended or adjusted under 35 U.S.C. 154(b) by 0 days.

(21) Appl. No.: 18/674,182

(22) Filed: May 24, 2024

(65) Prior Publication Data

US 2024/0308339 A1    Sep. 19, 2024

Related U.S. Application Data

(63) Continuation of application No. PCT/KR2023/017252, filed on Nov. 1, 2023.

(30) Foreign Application Priority Data

Nov. 30, 2022 (KR) .................. 10-2022-0165146

(51) Int. Cl.
*B60K 35/21* (2024.01)
*G06T 19/00* (2011.01)
*G06V 10/80* (2022.01)
*G06V 20/56* (2022.01)

(52) U.S. Cl.
CPC ............ *B60K 35/21* (2024.01); *G06T 19/006* (2013.01); *G06V 10/80* (2022.01); *G06V 20/56* (2022.01); *B60K 2360/176* (2024.01); *B60K 2360/177* (2024.01); *B60K 2360/31* (2024.01)

(58) Field of Classification Search
None
See application file for complete search history.

(56) References Cited

U.S. PATENT DOCUMENTS

| | | | |
|---|---|---|---|
| 8,616,884 B1 * | 12/2013 | Lechner | G09B 9/54 434/35 |
| 9,630,631 B2 * | 4/2017 | Alaniz | G06F 3/012 |
| 9,646,417 B1 * | 5/2017 | Sowadski | G06T 19/006 |
| 9,836,895 B1 * | 12/2017 | Nygaard | G07C 5/0841 |
| 10,030,931 B1 * | 7/2018 | Black | F41A 33/00 |
| 2018/0204478 A1 * | 7/2018 | Banga | G09B 9/042 |
| 2019/0095722 A1 | 3/2019 | Kang et al. | |
| 2019/0228571 A1 * | 7/2019 | Atsmon | G06F 30/20 |
| 2020/0209874 A1 * | 7/2020 | Chen | B60W 50/04 |
| 2021/0375055 A1 | 12/2021 | Jung et al. | |

FOREIGN PATENT DOCUMENTS

| | | |
|---|---|---|
| KR | 10-2019-0036844 A | 4/2019 |
| KR | 10-2021-0047896 A | 4/2021 |

* cited by examiner

*Primary Examiner* — Jason A Pringle-Parker
(74) *Attorney, Agent, or Firm* — Banner & Witcoff, Ltd.

(57) ABSTRACT

A method for generating a mixed reality image related to a driving environment is performed by one or more processors, and includes acquiring a real image related to the driving environment, generating a first virtual image including an object of the driving environment, and generating a mixed reality image including the object of the driving environment based on the real image and the first virtual image.

19 Claims, 10 Drawing Sheets

METHOD AND SYSTEM FOR GENERATING MIXED REALITY IMAGE RELATED TO DRIVING ENVIRONMENT

CROSS-REFERENCE TO RELATED APPLICATION

The present application is a continuation of International Patent Application No. PCT/KR2023/017252, filed Nov. 1, 2023, which is based upon and claims the benefit of priority to Korean Patent Application No. 10-2022-0165146, filed on Nov. 30, 2022. The disclosures of the above-listed applications are hereby incorporated by reference in their entirety.

BACKGROUND

Technical Field

The present disclosure relates to a method and a system for generating a mixed reality image related to a driving environment, and specifically, to a method and a system for generating a mixed reality image including an object of a driving environment based on a real image related to the driving environment and a virtual image including the object of the driving environment.

Description of Related Art

In recent years, with the advent of the 4th industrial revolution era, technologies related to autonomous driving vehicles are attracting attention as future vehicles. Autonomous driving technology with various advanced technologies, including IT technology, is increasing its status as a new growth engine in the automobile industry.

On the other hand, autonomous driving vehicles generally recognize the surrounding environment and determine the driving situation and control the vehicle without driver intervention to drive itself to a given destination, so these vehicles are related to various social issues such as safety regulations and driving regulations. Therefore, continuous performance testing is required to solve these social issues and commercialize autonomous driving technologies.

However, as parts and software of vehicles become increasingly diversified and complex, there are problems such as a place limitation and increased time and cost for the actual implementation of the driving environment to evaluate autonomous driving vehicles and testing the vehicles.

SUMMARY

In order to solve one or more problems (e.g., the problems described above and/or other problems not explicitly described herein), the present disclosure provides a method for, a non-transitory computer-readable recording medium storing instructions for, and an apparatus (system) for generating a mixed reality image related to a driving environment.

The present disclosure may be implemented in a variety of ways, including a method, a system (apparatus), or a computer program stored in a readable storage medium.

A method for generating a mixed reality image related to a driving environment may be performed by one or more processors and may include acquiring a real image related to the driving environment, generating a first virtual image including an object of the driving environment, and generating a mixed reality image including the object of the driving environment based on the real image and the first virtual image.

The first virtual image may include an image generated from a simulation model that implements the driving environment.

The method may further include generating a second virtual image related to the driving environment, in which the generating the mixed reality image based on the real image and the first virtual image may include generating a mixed reality image based on the real image, the first virtual image, and the second virtual image.

The second virtual image may include a semantic image generated from a simulation model that implements the driving environment.

The acquiring the real image related to the driving environment may include acquiring the real image using a first camera mounted on a vehicle.

The first virtual image may be generated from data acquired using a second camera mounted on a vehicle implemented in the simulation model, in which the vehicle implemented in the simulation model may be the same vehicle model as the vehicle, and The second camera may be a virtual camera implemented in the simulation model and having the same external and internal parameters as those of the first camera.

The second virtual image may be generated from data acquired using a third camera mounted on a vehicle implemented in the simulation model, in which the vehicle implemented in the simulation model may be the same vehicle model as the vehicle, and the third camera may be a virtual camera implemented in the simulation model and having the same external and internal parameters as those of the first camera.

The generating the mixed reality image based on the real image and the first virtual image may include extracting a portion corresponding to the object from the first virtual image, and generating a mixed reality image based on the portion corresponding to the object and the real image.

The extracting the portion corresponding to the object may include extracting the portion corresponding to the object by using the second virtual image.

The extracting the portion corresponding to the object based on the second virtual image may include filtering the second virtual image to generate a mask image for the object, and extracting the portion corresponding to the object from the first virtual image using the mask image.

The generating the mixed reality image based on the portion corresponding to the object and the real image may include removing part of the real image that corresponds to the portion corresponding to the object.

The removing the part of the real image that corresponds to the portion corresponding to the object may include removing the part of the real image that corresponds to the portion corresponding to the object by using the second virtual image.

The removing the part of the real image that corresponds to the portion corresponding to the object by using the second virtual image may include generating a mask inverse image from the second virtual image, and removing the part of the real image that corresponds to the portion corresponding to the object by using the mask inverse image.

The generating the mask inverse image may include generating a mask image for the object from the second virtual image, and generating the mask inverse image by inverting the mask image.

A computer-readable non-transitory recording medium storing instructions for executing the method described above on a computer is provided.

An information processing system is provided, which may include a communication module, a memory, and one or more processors connected to the memory and configured to execute one or more computer-readable programs included in the memory, in which the one or more programs may include instructions for acquiring a real image related to a driving environment, generating a first virtual image including an object of the driving environment, and generating a mixed reality image including the object of the driving environment based on the real image and the first virtual image.

By fusing the virtual object and the real driving environment, it is possible to implement various test situations regardless of a place limitation and test the autonomous driving vehicle.

By visualizing the virtual object in a real driving environment and providing the result, it is possible to allow a tester in the autonomous driving vehicle to visually perceive a virtual test situation in a real driving environment and smoothly perform tests on various driving environments.

Instead of actually placing a physical object for the test of the autonomous driving vehicle, it is possible to provide an image including a virtual object projected onto the driving environment during the test process of the autonomous driving vehicle, thereby saving time and cost required for the test.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, "mixed reality" (MR) may refer to the merging of the virtual and real worlds to create new information, such as new environments or visualizations. In other words, it may refer to a technology that grafts virtual reality to the real world, allowing physical and virtual objects to interact with each other.

In the present disclosure, a "real image" may refer to an image of a substantiated physical object or environment. For example, it may refer to an image of a vehicle, a roadway, or a surrounding object that are present in reality.

In the present disclosure, a "virtual image" may refer to an image of a virtually implemented object, rather than an image of a substantiated physical object. For example, it may refer to an image of an object in a virtual reality environment.

In the present disclosure, a "semantic image" may refer to an image applying a semantic segmentation technology. The semantic segmentation technology may refer to a technology that divides objects in an image into semantic units (e.g., objects), which is a technology for predicting a class to which each pixel in the image belongs.

In the present disclosure, a "mask image" may refer to an image used for masking a specific portion within the image. With respect to applying a specific effect to an image, the masking may refer to a process of distinguishing an area to apply the specific effect and the remaining area.

Figure 1:
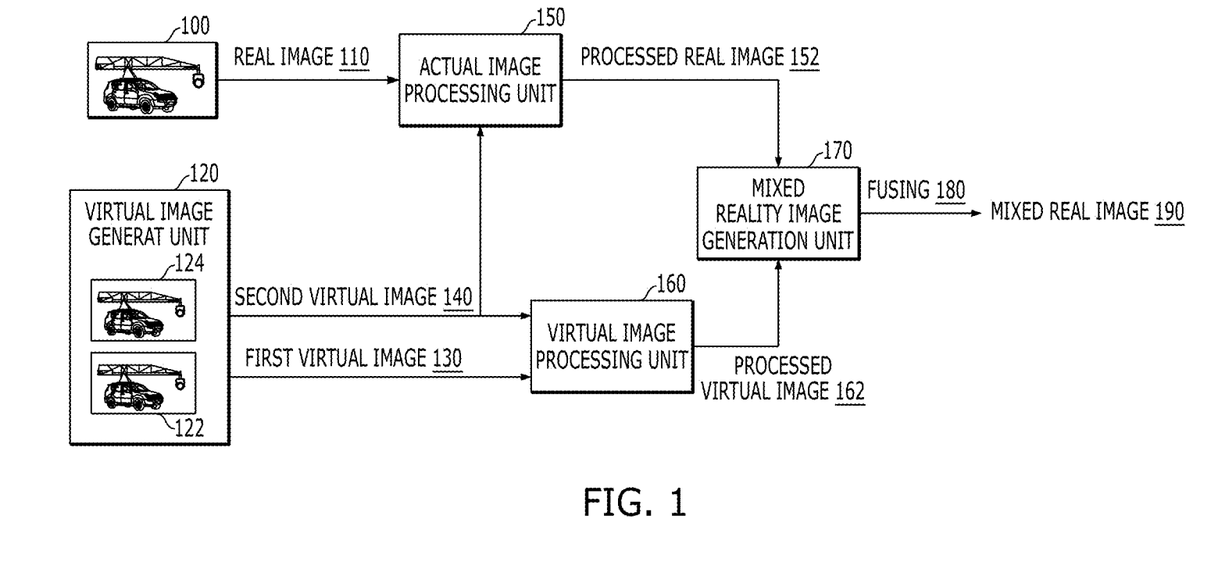
FIG. 1 illustrates an example of using a method for generating a mixed reality image related to a driving environment.

FIG. 1 illustrates an example of using a method for generating a mixed reality image related to a driving environment. As illustrated in FIG. 1, the system for generating mixed reality image may include a virtual image generation unit 120, a real image processing unit 150, a virtual image processing unit 160, and a mixed reality image generation unit 170, in which a mixed reality image 190 may be generated from a real image 110 and virtual images 130 and The real image 110 may be generated from a first camera 100. The first camera 100 may be a camera mounted on a vehicle. In addition, the real image 110 may be an image related to a driving environment. For example, the first camera 100 mounted on the vehicle may generate the real image 110 which is an image obtained by capturing a driving road and surrounding objects. The generated real image 110 may be transmitted to the real image processing unit 150.

The virtual image generation unit 120 may generate the virtual images 130 and 140 and transmit the virtual images to the real image processing unit 150 and the virtual image processing unit 160. The first virtual image 130 may include an image generated from a simulation model implementing a driving environment. In addition, the first virtual image 130 may be an image including objects of the driving environment (e.g., traffic cones, other driving vehicles, etc. located on a road). The second virtual image 140 may include a semantic image generated from a simulation model implementing the driving environment.

The first virtual image 130 may be generated from a second camera 122. In addition, the second virtual image 140 may be generated from a third camera 124. The second camera 122 may be a virtual camera mounted on a vehicle implemented in a simulation model, in which the vehicle implemented in the simulation model may be the same vehicle model as the vehicle mounted with the first camera 100. Likewise, the third camera 124 may also be a virtual camera mounted on a vehicle implemented in the simulation model, in which the vehicle implemented in the simulation model may be the same vehicle model as the vehicle mounted with the first camera 100. In addition, the second camera 122 and the third camera 124 may be virtual cameras implemented in the simulation model and set with the same external parameters (e.g., camera direction, etc.) and internal parameters (e.g., focal length, optical center, etc.) as those of the first camera.

The mixed reality image 190 including the objects of the driving environment may be generated based on the real image 110 and the first virtual image 130. To this end, a processed real image 152 from the real image 110 may be generated by the real image processing unit 150. In addition, a processed virtual image 162 may be generated from the first virtual image 130 by the virtual image processing unit 160. The processed real image 152 and the processed virtual image 162 may be fused by the mixed reality image generation unit 170 and the mixed reality image 190 may be generated (180). This will be described in more detail below with reference to FIGS. 4 to 6.

The second virtual image 140 may be used for generating the processed real image 152 and the processed virtual image 162. For example, the second virtual image 140 may be used for extracting a portion corresponding to the object from the first virtual image 130. In addition, the second virtual image 140 may be used for removing, from the real image 110, an image of a portion where the object would be located. This will be described in more detail below with reference to FIGS. 5 and 6.

With the configuration described above, instead of actually placing a physical object for the test of the autonomous driving vehicle, it is possible to provide an image including a virtual object projected onto the driving environment during the test process of the autonomous driving vehicle, thereby saving time and cost required for the test.

Figure 2:
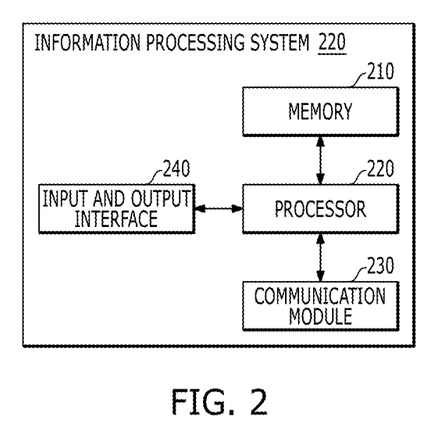
FIG. 2 is a block diagram illustrating an internal configuration of an information processing system.

FIG. 2 is a block diagram illustrating an internal configuration of the information processing system 200. The information processing system 200 may correspond to the system for generating mixed reality image including the virtual image generation unit 120, the real image processing unit 150, the virtual image processing unit 160, and the mixed reality image generation unit 170 of FIG. 1, and may include a memory 210, a processor 220, a communication module 230, and an input and output interface 240. The information processing system 200 may be configured to communicate information and/or data with an external system through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, etc. In another example, a non-destructive mass storage device such as ROM, SSD, flash memory, disk drive, etc. may be included in the information processing system 200 as a separate permanent storage device that is distinct from the memory. In addition, the memory 210 may store an operating system and at least one program code (e.g., a code for generating mixed reality image, which may be installed and driven in the information processing system 200).

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for generating mixed reality image, etc.), which may be installed by files provided by developers or a file distribution system that distributes application installation files through the communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may receive a plurality of pieces of information (e.g., real image) necessary for generating a mixed reality image and generate a mixed reality image related to the driving environment based on the received plurality of pieces of information.

The communication module 230 may provide a configuration or function for the user terminal (not illustrated) and the information processing system 200 to communicate with each other through a network, and may provide a configuration or function for the information processing system 200 to communicate with an external system (e.g., a separate cloud system). For example, control signals, commands, data, and the like provided under the control of the processor 220 of the information processing system 200 may be transmitted to the user terminal and/or the external system through the communication module 230 and the network through the communication module of the user terminal and/or an external system. For example, the user terminal may receive the generated mixed reality image related to the driving environment.

In addition, the input and output interface 240 of the information processing system 200 may be a means for interfacing with a device (not illustrated) for inputting or outputting, which may be connected to, or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

The processor 220 of the information processing system 200 may be configured to manage, process, and/or store the information and/or data received from a plurality of user terminals and/or a plurality of external systems. The processor 220 may receive a real image related to the driving environment. The processor 220 may generate a mixed reality image including the object of the driving environment based on the received real image and the generated virtual image.

Figure 3:
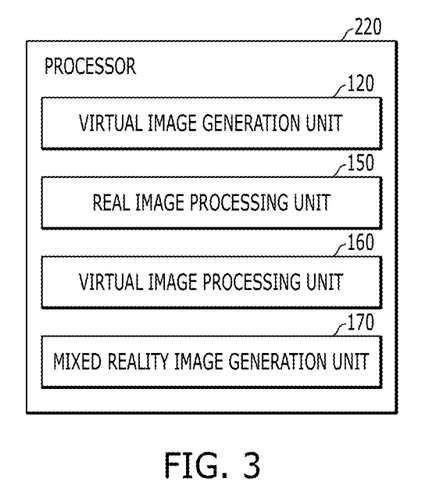
FIG. 3 illustrates an internal configuration of a processor of the information processing system.

FIG. 3 illustrates an internal configuration of the processor 220 of the information processing system 200. The processor 220 may include the virtual image generation unit 120, the real image processing unit 150, the virtual image processing unit 160, and the mixed reality image generation unit 170. The internal configuration of the processor 220 of the information processing system illustrated in FIG. 3 is merely an example, and at least some configurations of the processor 220 may be omitted or other configurations may be added, and at least some operations or processes performed by the processor 220 may be performed by a processor of a user terminal connected to communicate with the information processing system, and may also be implemented in other ways than illustrated. In addition, although the components of the processor 220 have been described separately for each function in FIG. 3, it does not necessarily mean that the components are physically separated. For example, although the real image processing unit 150 and the virtual image processing unit 160 are described above as separate configurations, this is to help understand the disclosure and aspects are not limited thereto.

The virtual image generation unit 120 may generate a virtual image for generating a mixed reality image related to the driving environment. For example, the virtual image generation unit 120 may generate a first virtual image that includes objects of the driving environment (e.g., traffic cones, another driving vehicle, etc. located on the road) and/or a second virtual image related to the driving environment. The first virtual image may include an image generated from a simulation model that implements the driving environment. The second virtual image may include a semantic image generated from a simulation model that implements the driving environment. The first virtual image and the second virtual image may be generated from data that is acquired using the second camera and the third camera mounted on the vehicle implemented in the simulation model. In this case, the vehicle implemented in the simulation model may be the same model as the vehicle that is mounted with the first camera for acquiring the real image. In addition, the second and third cameras may be virtual cameras implemented in the simulation model and having the same external parameters (e.g., camera direction, etc.) and internal parameters (e.g., focal length, optical center, etc.) as those of the first camera 100.

The real image processing unit 150 may generate, from the real image, a processed real image for generating a mixed reality image. For example, the real image processing unit 150 may generate a processed real image by removing part of the real image. In addition, the real image processing unit 150 may generate a processed real image by using the second virtual image. For example, the real image processing unit may generate a processed real image by generating a mask inverse image from the second virtual image and removing part of the real image by using the mask inverse image. This will be described in detail below with reference to FIG. 6.

The virtual image processing unit 160 may generate a processed virtual image from the first virtual image. For example, the virtual image processing unit 160 may generate a processed virtual image by extracting, from the first virtual image, a portion corresponding to the object. In addition, the virtual image processing unit 160 may generate a processed virtual image by using the second virtual image. For example, the virtual image processing unit 160 may generate a processed virtual image by generating a mask image from the second virtual image and extracting a portion corresponding to the object from the first virtual image by using the mask image. This will be described in detail below with reference to FIG. 5.

The mixed reality image generation unit 170 may generate a mixed reality image based on the processed virtual image and the processed real image. For example, the mixed reality image generation unit 170 may generate a mixed reality image by fusing the processed virtual image and the processed real image. This will be described in detail below with reference to FIG. 4.

Figure 4:
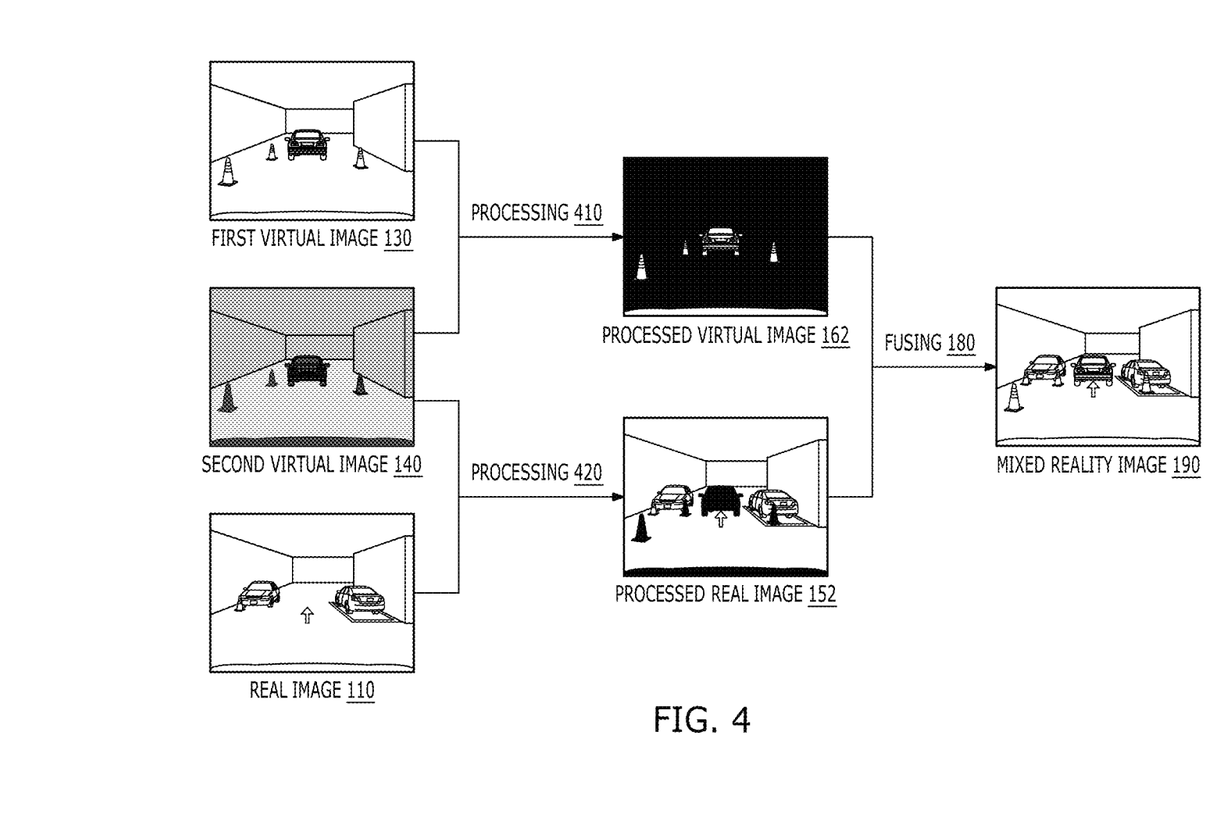
FIG. 4 illustrates an example of generating a mixed reality image from a real image and a virtual image.

FIG. 4 illustrates an example of generating the mixed reality image 190 from the real image 110 and the virtual images 130 and 140. As illustrated, the mixed reality image 190 may be generated based on the first virtual image 130, the second virtual image 140, and the real image 110.

The real image 110 may be an image related to the driving environment. For example, the real image 110 may be an image obtained by capturing a driving road for testing the autonomous driving vehicle. The first virtual image 130 may be an image generated from a simulation model that implements the same driving environment as the real image, and may include an object of the driving environment. For example, the first virtual image 130 may be an image obtained by capturing, through the camera in the simulation model, the surrounding vehicles or traffic cones present in the simulation model implementing the driving road of the real image. The second virtual image 140 may be a semantic image generated from a simulation model implementing the same driving environment as the real image. For example, the second virtual image 140 may be an image classified for each object by applying a semantic segmentation technology to an image obtained by capturing, through a camera in the simulation model, the surrounding vehicles or traffic cones present in the simulation model implementing the driving road of the real image.

The processed virtual image 162 may be generated by processing the first virtual image 130 (410). In more detail, the processed virtual image 162 may be processed in the virtual image processing unit 160, and may be generated by extracting, from the first virtual image 130, a portion corresponding to the object. For example, by extracting the portions corresponding to the vehicle and traffic cones present in the first virtual image, the processed virtual image 162 having only the extracted portions present therein may be generated. In addition, the second virtual image 140 may be used during the process of processing the first virtual image 130. For example, a mask image for the vehicle and the traffic cones present in the first virtual image may be generated by using the second virtual image 140, and an image, from which portions corresponding to the vehicle and the traffic cones are extracted by using the generated mask image, may be generated. This will be described in detail below with reference to FIG. 5.

The processed real image 152 may be generated by processing the real image 110 (420). In more detail, the processed real image 152 may be processed in the real image processing unit 150, and may be generated by removing, from the real image 110, part of the real image 110 that corresponds to a portion corresponding to the object of the first virtual image. For example, the processed real image 152 may be generated by removing part of the real image 110 that corresponds to the portions of the first virtual image where the vehicle and traffic cones are located. In addition, the second virtual image 140 may be used during the process of processing the real image 110. For example, a mask inverse image for the vehicle and traffic cones present in the first virtual image may be generated by using the second virtual image 140, and an image, from which part of the real image 110 is removed by using the generated mask inverse image, may be generated. This will be described in detail below with reference to FIG. 6.

The mixed reality image 190 may be generated by fusing the processed virtual image 162 and the processed real image 152 (180). In more detail, the mixed reality image 190 may be generated in the mixed reality image generation unit 170, and may be generated by projecting the objects present in the processed virtual image 162 onto the processed real image 152. For example, the mixed reality image 190 may be generated by projecting and fusing the vehicle and traffic cones present in the processed virtual image 162 onto the removed part of the processed real image 152.

Figure 5:
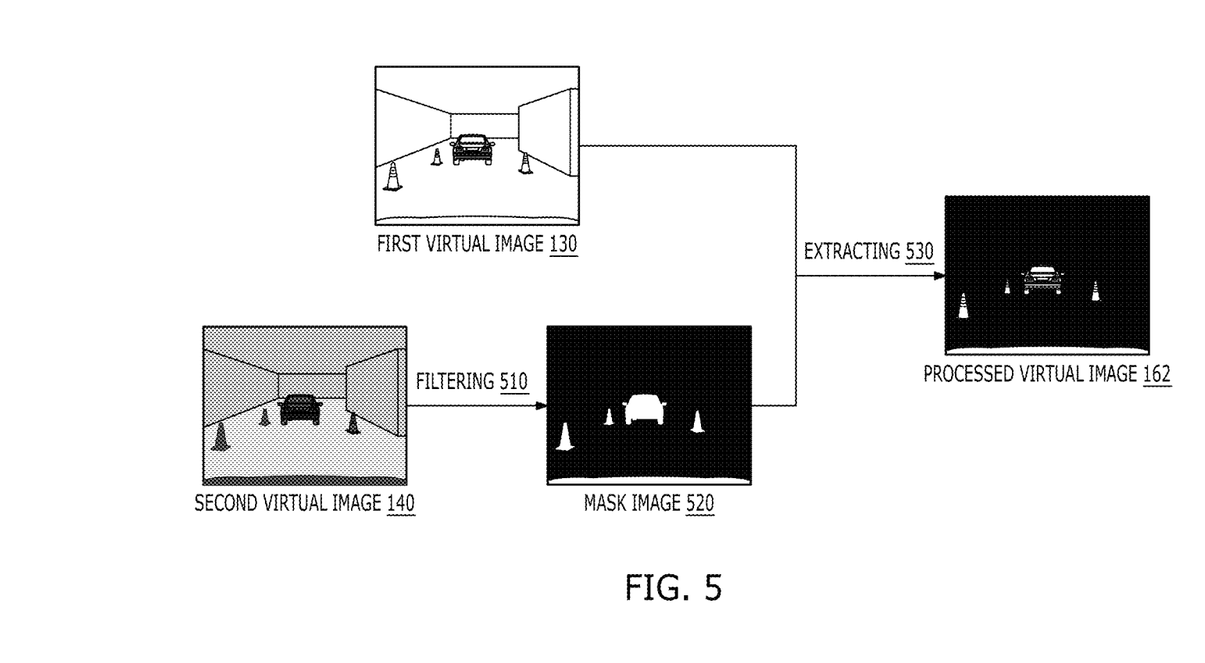
FIG. 5 illustrates an example of generating a processed virtual image from a first virtual image and a second virtual image.

FIG. 5 illustrates an example of generating the processed virtual image 162 from the first virtual image 130 and the second virtual image 140. The processed virtual image 162 may be generated by extracting a portion corresponding to the object from the first virtual image 130 (530). For example, by extracting portions corresponding to the vehicle and the traffic cones from the first virtual image 130, the processed virtual image 162, from which part other than the portions corresponding to the vehicle and the traffic cones is removed, may be generated.

A mask image 520 may be used for extracting a portion corresponding to the object from the first virtual image 130. For example, the mask image 520 may be an image that can mask the portion corresponding to the object in the first virtual image 130, and by applying the mask image 520 on the first virtual image 130, part other than the masked object portion may be removed. As described above, by masking the portion corresponding to the object in the first virtual image 130 using the mask image 520, the portion corresponding to the object may be extracted. In this case, the mask image 520 may be a binary type image.

The mask image 520 may be generated from the second virtual image 140. For example, the second virtual image 140 may be an image separated for each object through semantic segmentation technology, and the mask image 520 may be generated as a portion of the second virtual image corresponding to the object is filtered (510).

Figure 6:
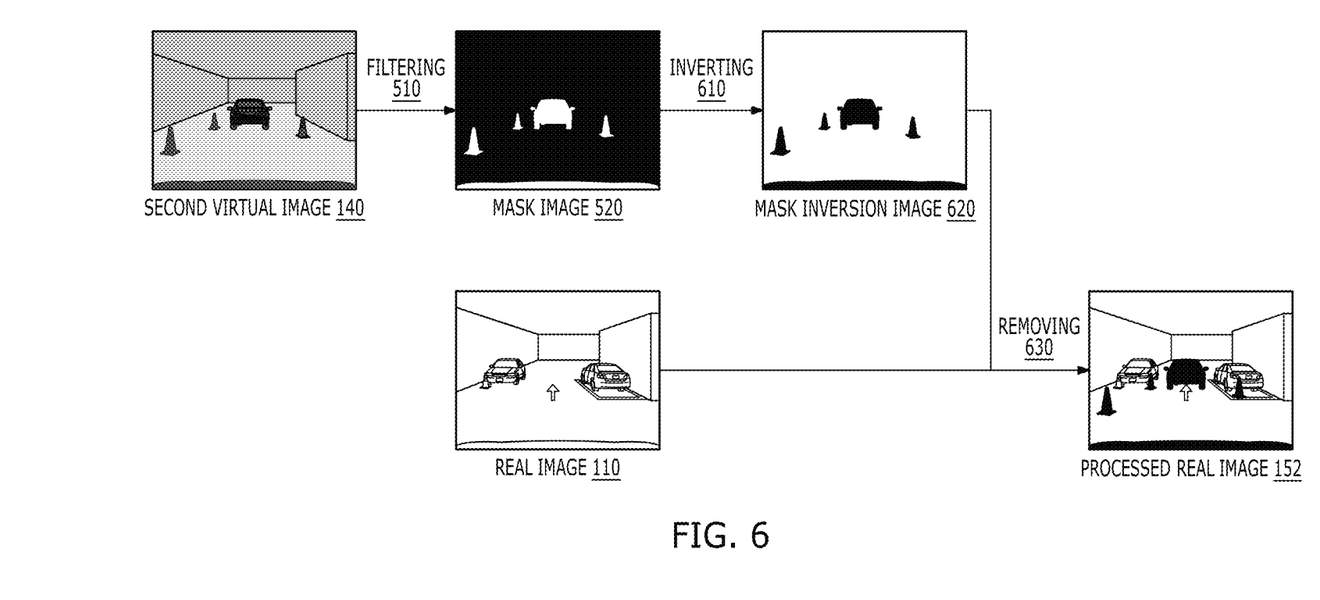
FIG. 6 illustrates an example of generating a processed real image from the real image and the second virtual image.

FIG. 6 illustrates an example of generating the processed real image 152 from the real image 110 and the second virtual image 140. The processed real image 152 may be generated by removing part of the real image 110 that corresponds to the portion corresponding to the object of the first virtual image 130 (630). For example, the processed real image 152 may be generated by removing part of the real image 110 that corresponds to the portions of the first virtual image where the vehicle and traffic cones are located in the real image 110.

A mask inverse image 620 may be used for removing part of the real image 110. The mask inverse image may be an image that can mask a part other than the portions corresponding to the objects in the first virtual image, and by applying the mask inverse image 620 to the real image 110, only the part corresponding to the portion corresponding to the object of the first virtual image may be removed.

The mask inverse image 620 may be generated from the second virtual image 140. For example, the mask image 520 may be generated by filtering the second virtual image 140 (510), and the mask inverse image 620 may be generated by inverting the mask image 520 (610). Like the mask image 520, the mask inverse image 620 may be a binary type image.

Figure 7:
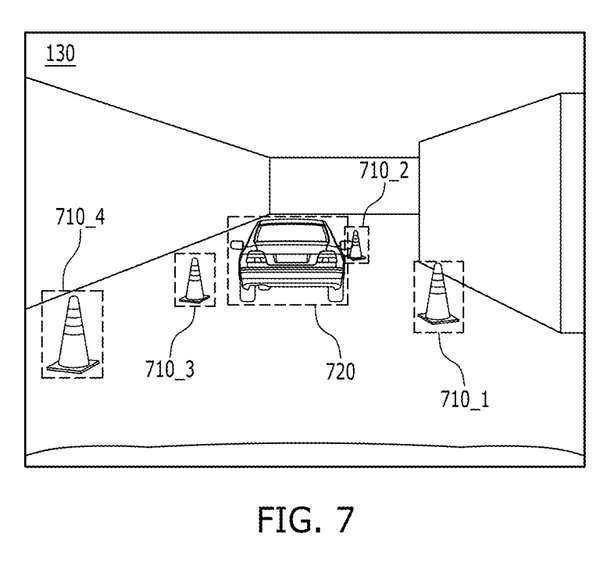
FIG. 7 illustrates an example of a virtual image.

FIG. 7 illustrates an example of the first virtual image 130. The first virtual image 130 may be an image generated from a simulation model that implements the same driving environment as the real image. In more detail, the first virtual image 130 may be generated from data acquired using a camera mounted on a vehicle implemented in the simulation model, in which the vehicle implemented in the simulation model may be the same vehicle model as the vehicle mounted with the camera that captured the real image. In addition, the camera used for generating the first virtual image 130 may be a virtual camera implemented in the simulation model and having the same external parameters (e.g., direction of the camera, etc.) and internal parameters (e.g., focal length, optical center, etc.) as the camera that captured the real image.

The first virtual image 130 may include an object of the driving environment. For example, the first virtual image 130 may be an image including a vehicle 720 driving nearby and traffic cones 710_1, 710_2, 710_3, and 710_4 placed nearby. These objects of the first virtual image 130 may be extracted and processed by a mask image, and may be fused with the real image to generate a mixed reality image.

Figure 8:
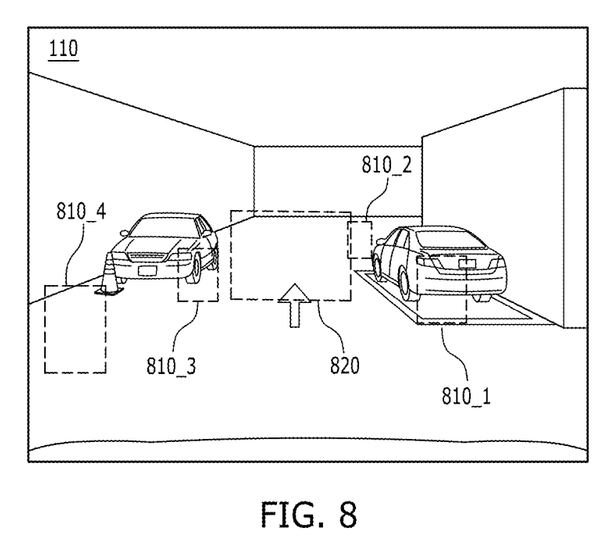
FIG. 8 illustrates an example of a real image.

FIG. 8 illustrates an example of the real image 110. The real image 110 may be an image related to the driving environment. For example, the real image 110 may be an image including a driving road and objects (e.g., surrounding vehicles, etc.) located nearby. In addition, the real image 110 may be acquired through the camera mounted on the vehicle.

The real image 110 may be processed to generate a mixed reality image. In more detail, part of the real image 110 that corresponds to a portion corresponding to the object of the first virtual image may be removed. For example, part 820 that corresponds to the portion of the first virtual image where the vehicle is located, and parts 810_1, 810_2, 810_3, and 810_4 that correspond to the portions where the traffic cones are located, may be removed through the mask inverse image.

Figure 9:
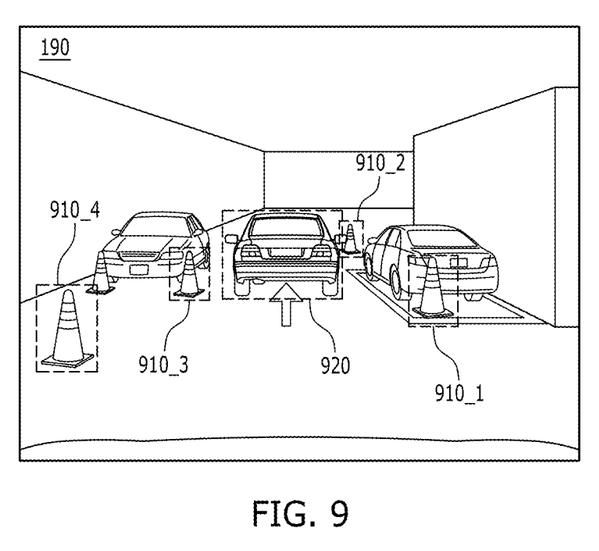
FIG. 9 illustrates an example of a mixed reality image.

FIG. 9 illustrates an example of the mixed reality image 190. The mixed reality image 190 may be generated by fusing the processed virtual image and the processed real image. The mixed reality image 190 may be generated by projecting the portions corresponding to the extracted objects of the first virtual image onto the real image. For example, the mixed reality image 190, which is image that fuses the virtual objects and the real image, may be generated by combining a surrounding vehicle 920 and traffic cones 910_1, 910_2, 910_3, and 910_4 of the first virtual image with the real image including the driving road.

By visualizing the virtual object in the real driving environment and providing the result as described above, it is possible to allow a tester in the autonomous driving vehicle to visually perceive a test situation and smoothly perform tests. In addition, instead of actually placing a physical object for the test of the autonomous driving vehicle, it is possible to provide an image including a virtual object projected onto the driving environment during the test process of the autonomous driving vehicle, thereby saving time and cost required for the test.

Figure 10:
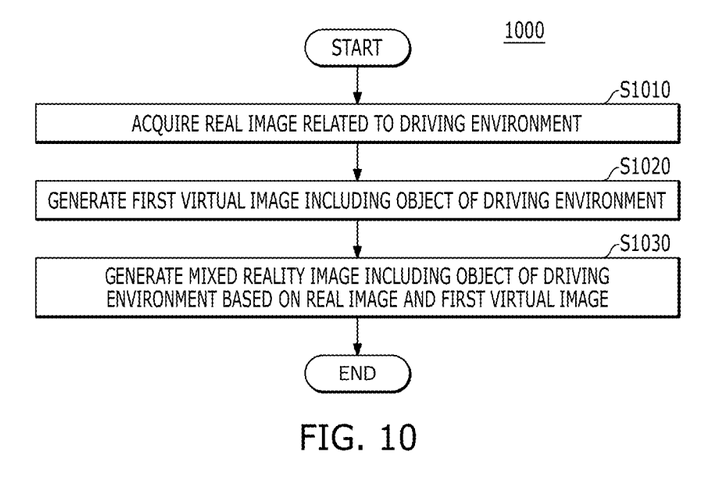
FIG. 10 is a flowchart illustrating a method for generating a mixed reality image related to a driving environment.

FIG. 10 is a flowchart illustrating a method 1000 for generating a mixed reality image related to a driving environment. The method 1000 may be performed by at least one processor (e.g., the processor 220) of the information processing system. As illustrated, the method 1000 may be initiated by acquiring a real image related to the driving environment, at S1010. The real image related to the driving environment may be acquired using the first camera mounted on the vehicle.

The processor may generate a first virtual image including the objects of the driving environment, at S1020. The first virtual image may include an image generated from a simulation model that implements the driving environment. In addition, the first virtual image may be generated from data acquired using a second camera mounted on a vehicle implemented in the simulation model, in which the vehicle implemented in the simulation model may be the same vehicle model as the vehicle mounted with the camera used for acquiring the real image. The second camera may be a virtual camera implemented in the simulation model and having the same external and internal parameters as those of the first camera.

The processor may generate a mixed reality image including the object of the driving environment based on the real image and the first virtual image, at S1030. The processor may extract the portions corresponding to objects from the first virtual image and generate a mixed reality image based on the portions corresponding to the objects and the real image. In addition, the processor may remove part of the real image that corresponds to the portions corresponding to the objects.

The processor may generate a second virtual image related to the driving environment, and generate a mixed reality image based on the real image, the first virtual image, and the second virtual image. The second virtual image may include a semantic image generated from a simulation model that implements the driving environment. In addition, the second virtual image may be generated from data acquired using a third camera mounted on a vehicle implemented in the simulation model, in which the vehicle implemented in the simulation model may be the same vehicle model as the vehicle mounted with the camera used for acquiring the real image, and the third camera may be a virtual camera implemented in the simulation model and having the same external and internal parameters as those of the first camera.

The processor may extract the portions corresponding to the objects from the first virtual image by using the second virtual image. The processor may generate a mask image for the object by filtering the second virtual image, and extract the portions corresponding to the objects from the first virtual image by using the mask image.

The processor may remove part of the real image that corresponds to the portions corresponding to the objects of the first virtual image by using the second virtual image. The processor may generate a mask inverse image from the second virtual image and remove part of the real image that corresponds to the portions corresponding to the objects by using the mask image. For the mask inverse image, a mask image for the objects may be generated from the second virtual image and the mask inverse image may be generated by inverting the mask image.

The flowchart illustrated in FIG. 10 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for launch on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for generating a mixed reality image related to a driving environment, the method being performed by one or more processors and comprising:
   acquiring a real image related to the driving environment;
   generating a first virtual image including an object of the driving environment;
   generating a second virtual image related to the driving environment so as to process the real image and the first virtual image; and
   based on the real image, the first virtual image, and the second virtual image, generating a mixed reality image including the object of the driving environment, wherein the generating the mixed reality image based on the real image, the first virtual image, and the second virtual image includes:
   extracting, by using the second virtual image, a portion corresponding to the object from the first virtual image; and
   generating the mixed reality image based on the portion corresponding to the object and the real image.

2. The method according to claim 1, wherein the first virtual image includes an image generated from a simulation model that implements the driving environment.

3. The method according to claim 1, wherein the second virtual image includes a semantic image generated from a simulation model that implements the driving environment.

4. The method according to claim 1, wherein the acquiring the real image related to the driving environment includes acquiring the real image using a first camera mounted on a vehicle.

5. The method according to claim 4, wherein the first virtual image is generated from data acquired using a second camera mounted on a vehicle implemented in a simulation model, wherein the vehicle implemented in the simulation model is a same vehicle model as the vehicle, and wherein the second camera is a virtual camera implemented in the simulation model and having same external and internal parameters as those of the first camera.

6. The method according to claim 4, wherein the second virtual image is generated from data acquired using a third camera mounted on a vehicle implemented in a simulation model, wherein the vehicle implemented in the simulation model is a same vehicle model as the vehicle, and wherein the third camera is a virtual camera implemented in the simulation model and having same external and internal parameters as those of the first camera.

7. The method according to claim 1, wherein the extracting the portion corresponding to the object by using the second virtual image includes:

filtering the second virtual image to generate a mask image for the object; and extracting the portion corresponding to the object from the first virtual image by using the mask image.

8. The method according to claim 1, wherein the generating the mixed reality image based on the portion corresponding to the object and the real image includes removing part of the real image that corresponds to the portion corresponding to the object.

9. The method according to claim 8, wherein the removing the part of the real image that corresponds to the portion corresponding to the object includes removing the part of the real image that corresponds to the portion corresponding to the object by using the second virtual image.

10. The method according to claim 9, wherein the removing the part of the real image that corresponds to the portion corresponding to the object by using the second virtual image includes:

generating a mask inverse image from the second virtual image; and removing the part of the real image that corresponds to the portion corresponding to the object by using the mask inverse image.

11. The method according to claim 10, wherein the generating the mask inverse image includes:

generating a mask image for the object from the second virtual image; and generating the mask inverse image by inverting the mask image.

12. A non-transitory computer-readable recording medium storing instructions for causing performance of the method according to claim 1 on a computer.

13. An information processing system, comprising:
a communication module;
a memory; and
one or more processors connected to the memory and configured to execute one or more computer-readable programs included in the memory,
wherein the one or more computer-readable programs include instructions for:
acquiring a real image related to a driving environment;
generating a first virtual image including an object of the driving environment;
generating a second virtual image related to the driving environment so as to process the real image and the first virtual image; and
based on the real image, the first virtual image, and the second virtual image, generating a mixed reality image including the object of the driving environment, wherein the generating the mixed reality image based on the real image, the first virtual image, and the second virtual image includes:
extracting, by using the second virtual image, a portion corresponding to the object from the first virtual image; and
generating the mixed reality image based on the portion corresponding to the object and the real image.

14. A method for generating a mixed reality image related to a driving environment, the method being performed by one or more processors and comprising:

acquiring a real image related to the driving environment;
generating a first virtual image including an object of the driving environment;
generating a second virtual image related to the driving environment so as to process the real image and the first virtual image; and
based on the real image, the first virtual image, and the second virtual image, generating a mixed reality image including the object of the driving environment, wherein the generating the mixed reality image based on the real image, the first virtual image, and the second virtual image includes:
extracting a portion corresponding to the object from the first virtual image; and
generating the mixed reality image based on the portion corresponding to the object and the real image, wherein the generating the mixed reality image based on the portion corresponding to the object and the real image includes removing part of the real image that corresponds to the portion corresponding to the object.

15. The method according to claim 14, wherein the acquiring the real image related to the driving environment includes acquiring the real image using a first camera mounted on a vehicle.

16. The method according to claim 15, wherein the first virtual image is generated from data acquired using a second camera mounted on a vehicle implemented in a simulation model, wherein the vehicle implemented in the simulation model is a same vehicle model as the vehicle, and wherein the second camera is a virtual camera implemented in the simulation model and having same external and internal parameters as those of the first camera.

17. The method according to claim 14, wherein the first virtual image includes an image generated from a simulation model that implements the driving environment, and wherein the second virtual image includes a semantic image generated from a simulation model that implements the driving environment.

18. The method according to claim 14, wherein the removing the part of the real image that corresponds to the portion corresponding to the object includes removing the part of the real image that corresponds to the portion corresponding to the object by using the second virtual image.

19. A non-transitory computer-readable recording medium storing instructions for causing performance of the method according to claim 14 on a computer.

* * * * *